(12) United States Patent
Waters et al.

(10) Patent No.: US 7,761,217 B2
(45) Date of Patent: Jul. 20, 2010

(54) DIAGNOSTICS FOR TWO-MODE VARIABLE VALVE ACTIVATION DEVICES

(75) Inventors: James P. Waters, Waterford, MI (US); Jeffrey S. Gutterman, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 322 days.

(21) Appl. No.: 12/074,481

(22) Filed: Mar. 4, 2008

(65) Prior Publication Data

US 2009/0228167 A1 Sep. 10, 2009

(51) Int. Cl.
*G01M 15/00* (2006.01)
*F02D 13/00* (2006.01)
*G06F 19/00* (2006.01)

(52) U.S. Cl. .................. 701/103; 701/115; 701/29; 123/90.16

(58) Field of Classification Search ......... 701/103–105, 701/29, 115, 102; 123/90.12, 90.16, 90.39, 123/90.44
See application file for complete search history.

(56) References Cited

U.S. PATENT DOCUMENTS

| 4,862,844 | A * | 9/1989 | Wakeman et al. | 123/90.12 |
| 7,225,776 | B2 * | 6/2007 | Gecim et al. | 123/90.39 |
| 7,377,247 | B2 * | 5/2008 | Seitz | 123/90.16 |

* cited by examiner

*Primary Examiner*—Hieu T Vo
(74) *Attorney, Agent, or Firm*—Thomas N. Twomey

(57) ABSTRACT

A method for detecting a low-lift or zero-lift failure mode in a variable valve activation system of an internal combustion engine includes the steps of positioning a piezo-electric element that acts as a radio frequency transmitter relative to a lost motion spring of a two-mode variable valve activation lost motion device, subjecting the piezo-electric element to a compression load when a load from displacement of a lobe of a camshaft acts on the lost motion spring, broadcasting a radio frequency signal each time the piezo-electric element is subjected to the compression load, and evaluating the presence or absence of the broadcasted radio frequency signal in relation to an expected presence or absence of the radio frequency signal. The direct measurement of the mode of each two-mode device is both more reliable and more efficient in the use of engine controller resources compared to currently existing diagnostic methods.

25 Claims, 9 Drawing Sheets

DIAGNOSTICS FOR TWO-MODE VARIABLE VALVE ACTIVATION DEVICES

TECHNICAL FIELD

The present invention relates to mechanisms for altering the actuation of valves in internal combustion engines; more particularly, to two-mode variable valve activation devices; and most particularly, to a method and apparatus for detection of a low-lift or zero-lift failure mode for such devices.

BACKGROUND OF THE INVENTION

Variable Valve Activation (VVA) mechanisms for internal combustion engines are well known. It is known to lower the lift, or even to provide no lift at all, of one or more valves of a multiple-cylinder engine, during periods of light engine load. Such deactivation or valve lift switching can substantially improve fuel efficiency.

Various approaches are known for changing the lift of valves in a running engine. One known approach is to provide an intermediary cam follower arrangement, which is rotatable about the engine camshaft and is capable of changing the valve lift and timing, the camshaft typically having both high-lift and low-lift lobes for each such valve.

For example, a Roller Finger Follower (RFF) typically acts between a rotating camshaft lobe and a pivot point such as a Hydraulic Lash Adjuster (HLA) to open and close an engine valve. By way of example, switchable deactivation RFF includes an outer arm, also known as body or low-lift follower, and an inner arm, also known as high-lift follower. The inner arm supports a roller carried by a shaft. The roller is engaged by a lobe of an engine camshaft that causes the outer arm to pivot about the HLA, thereby actuating an associated engine valve. The deactivation RFF is selectively switched between a coupled (high-lift) and decoupled (zero-lift) mode. In the coupled mode the inner arm is coupled to the outer arm by a movable latching mechanism and rotation of the lifting cam is transferred from the roller through the shaft to pivotal movement of the outer arm, which in turn, reciprocates the associated valve. In the decoupled mode, the inner arm is decoupled from the outer arm. Thus, the inner arm does not transfer rotation of the lifting cam lobe to pivotal movement of the outer arm, and the associated valve is not reciprocated. In this mode, the roller shaft is reciprocated within the outer arm.

A switchable, two-step RFF operates in a manner similar to the deactivation RFF, as described above. However, one particular difference between the operation of a deactivation RFF and a two-step RFF occurs in the decoupled mode of operation. When in the decoupled (zero-lift) mode, the outer arm of a deactivation RFF may be engaged by zero-lift cam lobes and remains in a static position allowing the associated valve to remain closed. On the other hand, when in decoupled (low-lift) mode, the outer arm of a two-step RFF is engaged by low-lift camshaft lobes to thereby reciprocate the associated engine valve according to the lift profile of the low-lift camshaft lobe.

A lost motion spring maintains contact between the roller and the lifting portion of the camshaft lobe when either type of RFF (i.e., deactivation or two-step) is in the decoupled (zero-lift or low-lift, respectively) mode and absorbs the reciprocal motion of the shaft and roller. The lost motion spring biases the inner arm away from the outer arm of the RFF. The expansion force of the lost motion spring acting on the inner arm must on the one hand be sufficient to maintain contact of the roller with the lifting portion of the cam lobe, while on the other hand must not cause the HLA, which supports the outer arm to be pumped down by the force of the lost motion spring.

Another known approach is to provide a deactivation mechanism in the Hydraulic Lash Adjuster (HLA) upon which a cam follower rocker arm pivots. Such arrangement is advantageous in that it can provide variable lift from a single cam lobe by making the HLA either competent or incompetent to transfer the motion of the cam eccentric to the valve stem. Yet another known approach is to provide a deactivation mechanism in the Hydraulic Valve Lifter (HVL).

During the operation of the above mentioned two-mode variable valve activation devices a variety of failure modes may occur. One failure mode of particular concern is the condition when one or more of the two-mode variable valve activation devices are stuck in the low-lift or zero-lift mode. This failure mode may have severe base-engine-level consequences at high engine speeds since the lost motion spring is only able to absorb the force provided by the lobe of the camshaft to the roller up to certain engine rotational speeds. Thus, extensive mechanical failure of the engine may occur if the engine is operated at high engine speeds in low-lift or zero-lift mode. Currently used passive diagnostic strategies that rely upon existing data available in engine management systems are in many cases neither responsive nor sensitive enough to satisfy customer requirements. The only alternative presently available is to compromise the camshaft profile to reduce valve closing velocity, thereby reducing the destructive energy associated with running the engine at high speeds in low-lift or zero-lift modes. This alternative is unacceptable because the resultant camshaft profile negates most of the potential fuel economy benefits achieved by applying two-mode VVA to the engine. This situation hampers the ability of the original equipment manufacturers to provide a two-mode VVA, a proven fuel economy and emissions improvement technology, in a federally certified production vehicle.

What is needed in the art is the ability to reliably detect a low-lift or zero-lift failure mode that occurs when one or more two-mode variable valve activation devices are stuck in low-lift mode at high engine speeds where these devices typically operate in high-lift mode.

It is a principal object of the present invention to provide a method and apparatus for direct measurement of the mode of each two-mode variable valve activation device used in a multiple-cylinder engine.

SUMMARY OF THE INVENTION

Briefly described, the invention addresses the shortcomings of prior art diagnostic strategies and algorithms for a low-lift or zero-lift failure mode of two-mode Variable Valve Activation (VVA) lost motion devices by integrating a piezoelectric Radio Frequency (RF) transmitter in each individual two-mode VVA device of a multiple-cylinder internal combustion engine. The direct measurement of the mode of each two-mode VVA device as opposed to the prior art attempts to infer the proper function of these devices by applying arcane neutral net or fuzzy logic data analysis techniques to existing engine control system data, is both more reliable and more efficient in it's use of engine controller resources, such as Random Access Memory (RAM), Read-only Memory (ROM), and throughput. The diagnostics in accordance with the invention is applicable for a variety of two-mode VVA lost motion devices, for example two-step and deactivation RFFs with compression or torsion lost motion springs, deactivation roller hydraulic valve lifters with internal or external lost motion springs, and deactivation switching Hydraulic Lash Adjusters (HLA).

The diagnostic strategy in accordance with the invention uses a wireless RF approach that employs an on-arm piezo-electric RF transmitter, for example in form of a piezo-electric wafer, and an under-camshaft cover RF receiver that is able to detect if one or more two-mode VVA devices are stuck in a low-lift or zero-lift mode. The piezo-electric RF transmitter is positioned preferably under the lost motion spring of each two-mode variable valve activation device. In one of the two operating modes of the VVA device, such as high-lift mode, one or more lock pins block the lost motion spring from being cyclically loaded by the camshaft lift displacement and, hence, no "lost motion" load is to be absorbed by the spring and, thus the piezo-electric transmitter. In this mode no RF transmission occurs. In the other of the two operating modes of the VVA device, such as low-lift or zero-lift mode, the lock pin or pins are retracted and the lost motion spring is subjected to the repetitive cyclical compression (or torsion) load from absorbing the displacement of the camshaft lobe or lobes. This cyclical load on the spring results in a compression load upon the piezo-electric transmitter. As a result of the compression load upon the piezo-electric transmitter an RF signal is transmitted with each cam lift event. Accordingly, the presence or absence of an RF signal in relation to an expected presence or absence of the RF signal can be used to reliably detect a malfunctioning two-mode VVA device.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates preferred embodiments of the invention, in one form, and such exemplification is not to be construed as limiting the scope of the invention in any manner.

DESCRIPTION OF THE PREFERRED EMBODIMENTS

Figure 1:
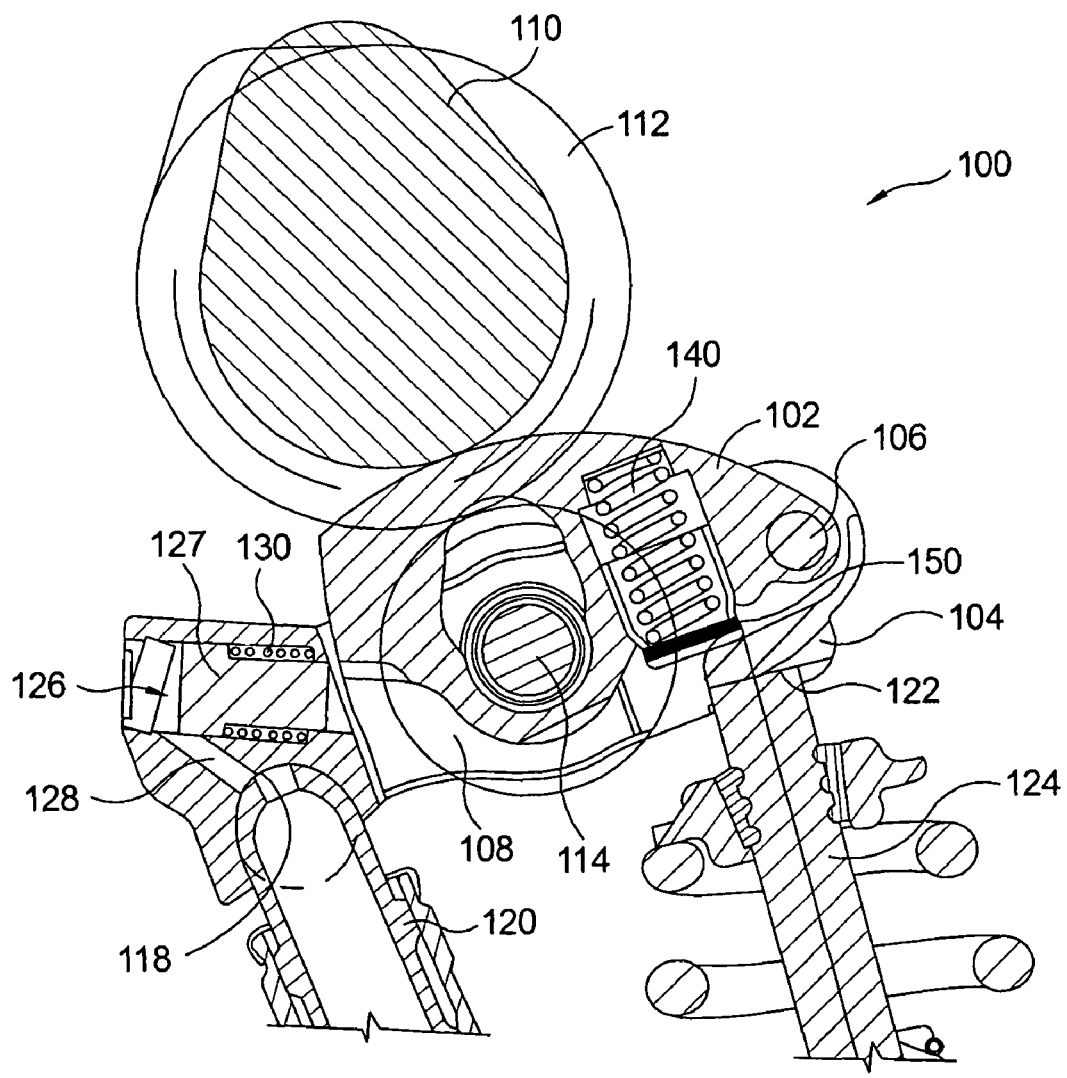
FIG. 1 is a cross-sectional view of a two-step roller finger follower assembly, in accordance with the invention.

Referring to FIG. 1, a two-step Roller Finger Follower (RFF) assembly 100 includes an inner arm 102 that is pivotably disposed in an outer arm 104. Inner arm 102 pivots within outer arm 104 about a pivot shaft 106. A roller 108 for following a cam lobe 110 of a lifting cam of an engine camshaft 112 is carried by a shaft 114 that is supported by outer arm 102. A socket 118 for pivotably mounting RFF assembly 100 on a Hydraulic Lash Adjuster (HLA) 120 is included at one end of outer arm 104. A pad 122 for actuating a valve stem 124 is included at an opposite end of outer arm 104. A latching mechanism 126, such as lock pin 127, disposed within outer arm 104 at the same end as socket 118 selectively couples or decouples inner arm 102 to or from outer arm 104, which enables switching from a high-lift mode to a low-lift mode and vice versa. Controlled by an engine control module, pressurized oil supplied by the HLA 120 through oil passage 128 in known fashion hydraulically biases lock pin 126 from a retracted position to an expanded position toward inner arm 102. When engine control module determines, in known fashion from various engine operating parameters, that inner arm 102 should be unlocked to switch to low-lift mode, the oil pressure is reduced such that a return spring 130 may bias lock pin 127 to a retracted position away from inner arm 102.

A lost motion spring 140 acts between inner arm 102 and outer arm 104 by biasing inner arm 102 away from the outer arm 104 of the RFF. Lost motion spring 140 maintains contact between roller 108 and the lifting cam lobe 110 when RFF assembly 100 is in the decoupled mode. Lost motion spring 140 thus biases roller 108 against the lifting cam lobe 110, and absorbs the reciprocal motion of shaft 114 and roller 108. Lost motion spring 140 is shown in FIG. 1 as a compression spring but may further be a torsion spring a shown in FIG. 3. RFF assembly 100 is a two-mode lost motion Variable Valve Activation (VVA) device.

A device that generates an electrical potential in response to an applied mechanical stress such as, for example, a piezo-electric element 150 is positioned under lost motion spring 140 such that a load from absorbing the displacement of the cam lobe 110 acting on lost motion spring 140 results in a compression load upon piezo-electric element 150. Piezo-electric element 150 may be a wafer that may have a variety of geometric shapes. Piezo-electric element 150 may be, for example, a disk, a rectangular plate, or a ring. When piezo-electric element 150 is a ring, oil passage through element 150 is enabled for lubricating purposes. Piezo-electric element 150 acts as an RF transmitter and, accordingly, an RF signal is transmitted each time lost motion spring 140 is subjected to a load, a compression load. The RF signal is detected by an RF receiver (not shown) that is connected with an engine controller. The RF receiver may be positioned, for example, under a camshaft cover.

When RFF assembly 100 is operated in low-lift mode, lost motion spring 140 is subjected to a repetitive cyclical load from absorbing the displacement of inner arm 102 relative to outer arm 104 which results in a cyclical compression load upon the piezo-electric element 150 from which an RF signal is broadcasted by the transmitter. When RFF assembly 100 is operated in high-lift mode, lock pin 127 is expanded and substantially blocks lost motion spring 140 from being cyclically loaded by the displacement of cam lobe 110, hence no load is to be absorbed by spring 140 and no compression load acts upon piezo-electric element 150. As a result, no RF signal is broadcasted by the transmitter. The presence or absence of the broadcasted RF signals in relation to the expected presence or absence of the RF signals is used for diagnostics of the VVA mechanism of RFF assembly 100.

Figure 2:
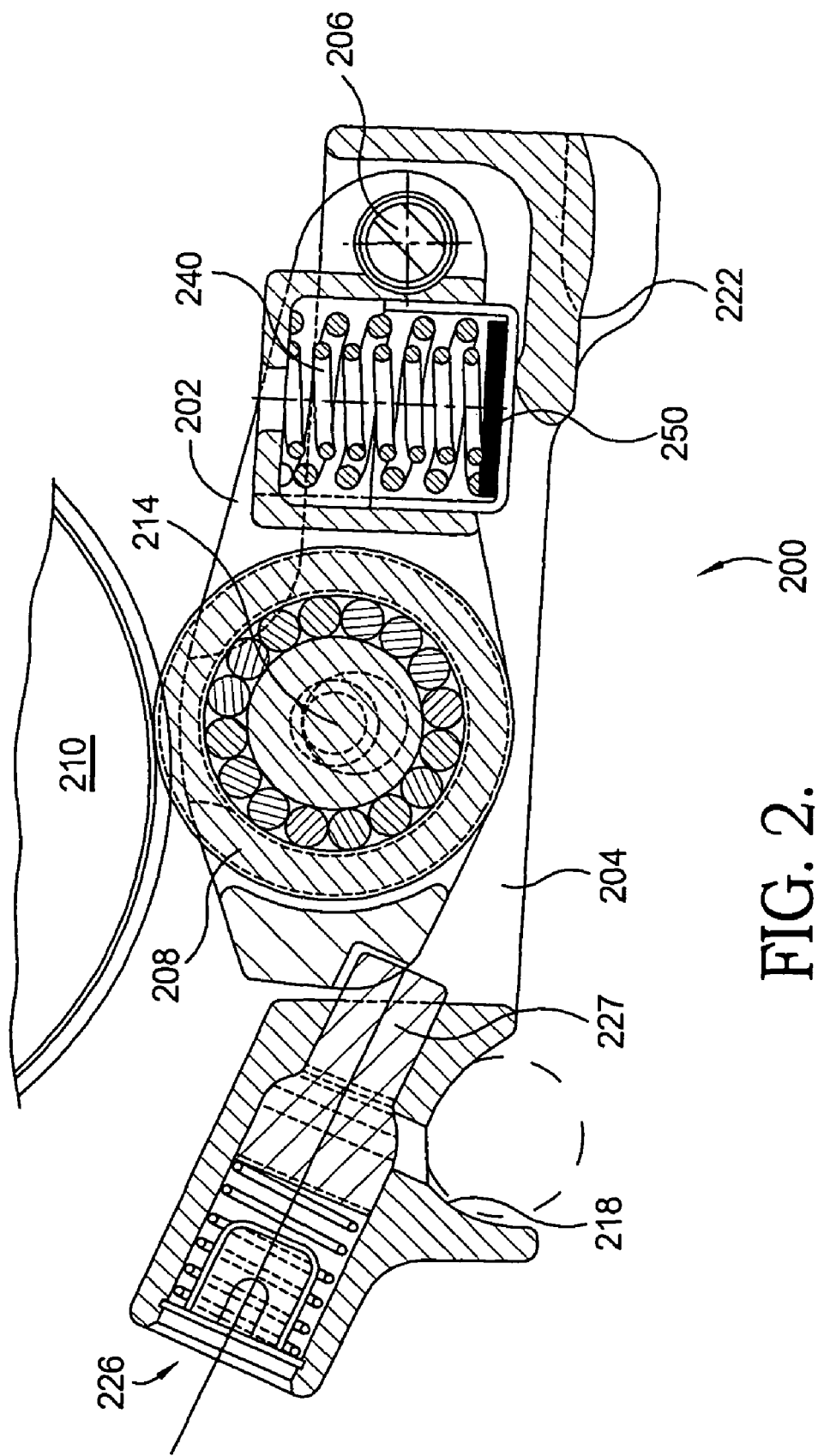
FIG. 2 is a cross-sectional view of a first deactivation roller finger follower assembly, in accordance with the invention.

Referring to FIG. 2, a first deactivation RFF assembly 200 includes an inner arm 202 that is pivotably and therefore deactivateably in an outer arm 204. Inner arm 202 pivots within outer arm 204 about a pivot shaft 206. A roller 208 is carried by a shaft 214 that is supported by the inner arm 202. A lost motion spring 240 acts between inner arm 202 and outer arm 204. As shown in FIG. 2, lost motion spring 240 may be, but is not limited to, a compression spring. Also, lost motion spring 240 may include one or more lost motion springs as shown in FIG. 2. A socket 218 for pivotably mounting RFF assembly 200 on an HLA, such as HLA 120 as shown in FIG. 1, is included at one end of outer arm 204. A pad 222 for actuating a valve stem, such as valve stem 124 as shown in FIG. 1, is included at an opposite end of outer arm 204. A latching mechanism 226, such as lock pin 227, disposed within outer arm 204 selectively couples or decouples inner arm 202 to or from outer arm 204.

The deactivation RFF assembly 200 is selectively switched between a coupled and a decoupled state. In the coupled state, inner arm 202 is coupled to outer arm 204, and rotation of a lifting cam lobe 210 is transferred from roller 208 through shaft 214 to pivotal movement of outer arm 204 about the HLA which, in turn, reciprocates the associated valve (normal or high-lift mode). In the decoupled state, inner arm 202 is decoupled from outer arm 204 and reciprocates within outer arm 204 thereby applying a cyclical load to lost compressing lost motion spring 240. Rotation of cam lobe 210 is not transferred to pivotal movement of outer arm 204. Instead, its rotational movement is absorbed by lost motion spring 240. RFF 100 assembly is a two-mode lost motion VVA device.

A piezo-electric element 250 that has similar characteristics as piezo-electric element 150 as described above in connection with FIG. 1 is positioned under lost motion spring 240 such that a load from absorbing the displacement of the cam lobe 210 results in a compression load upon piezo-electric element 250.

Figure 3:
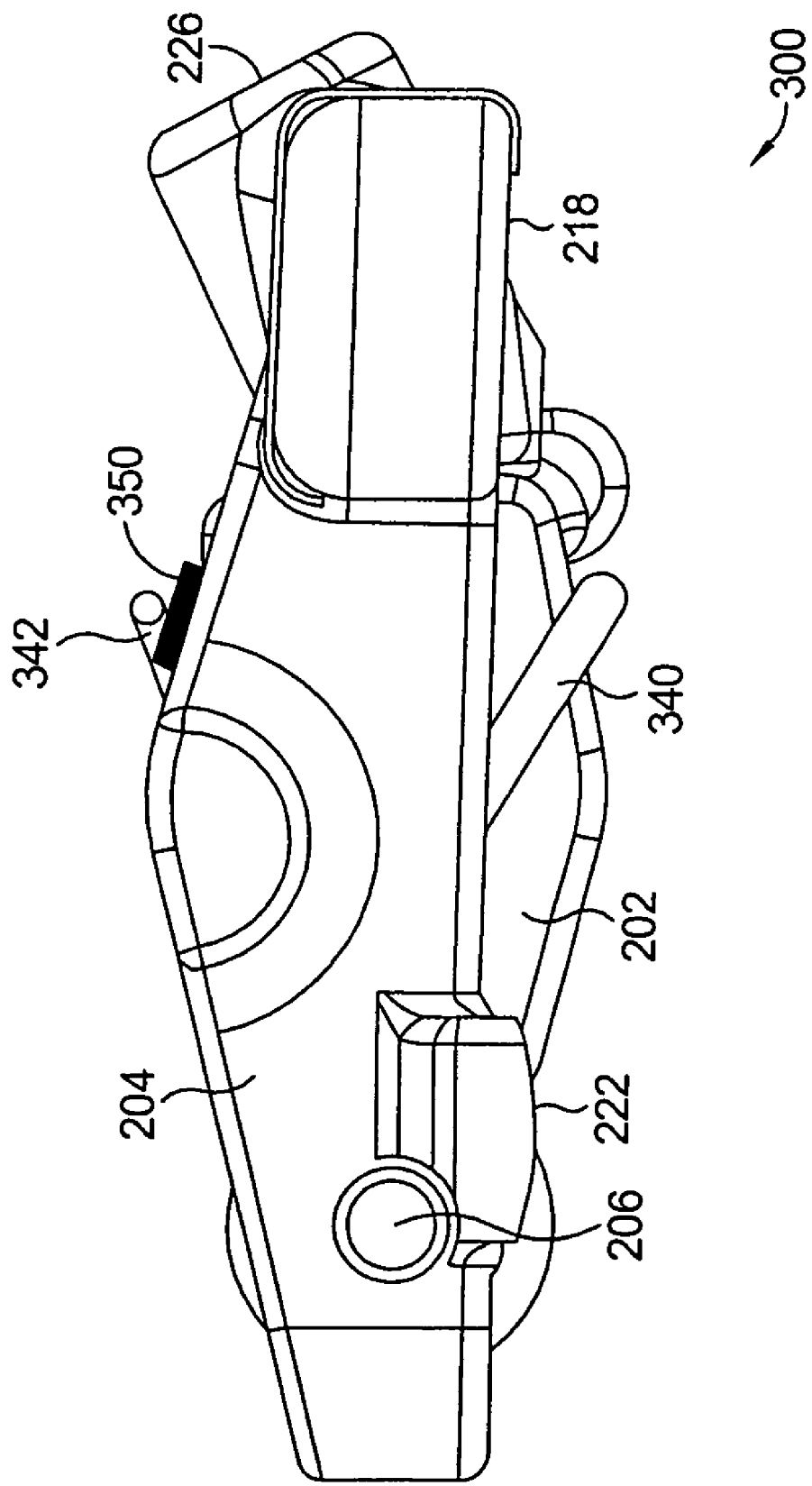
FIG. 3 is a side elevational view of a second deactivation roller finger follower assembly, in accordance with the invention.

Referring to FIG. 3, a second deactivation RFF assembly 300 is similar to the first deactivation RFF assembly 200 except that assembly 300 includes a torsion spring as lost motion spring 340. A piezo-electric element 350 that has similar characteristics as piezo-electric element 150 as described above in connection with FIG. 1 is positioned under one of the ends 342 that anchor the torsion spring to outer arm 204. That is, an RF signal is transmitted by piezo-electric element 150 each time the lost motion spring is subjected to a torsion load when the inner arm is in lost motion.

When deactivation RFF assemblies 200 and 300 as shown in FIGS. 2 and 3 are operated in zero-lift mode, lost motion springs 240 and 340 are subjected to a repetitive cyclical load from absorbing the displacement of inner arm 202 relative to outer arm 204 which results in a compression load upon the piezo-electric elements 250 and 350 and an RF signal is broadcasted by the transmitter. When deactivation RFF assemblies 200 and 300 as shown in FIGS. 2 and 3 are operated in high-lift mode, latching mechanism 226 is expanded and substantially blocks lost motion springs 240 and 340 from being cyclically loaded by the displacement of cam lobe 210, hence no load is to be absorbed by springs 240 and 340 and no compression load acts upon piezo-electric elements 250 and 350. As a result, no RF signal is broadcasted. The presence or absence of the broadcasted RF signals in relation to the expected presence or absence of the RF signals is used for diagnostics of the VVA mechanism of deactivation RFF assemblies 200 and 300.

Figure 4A:
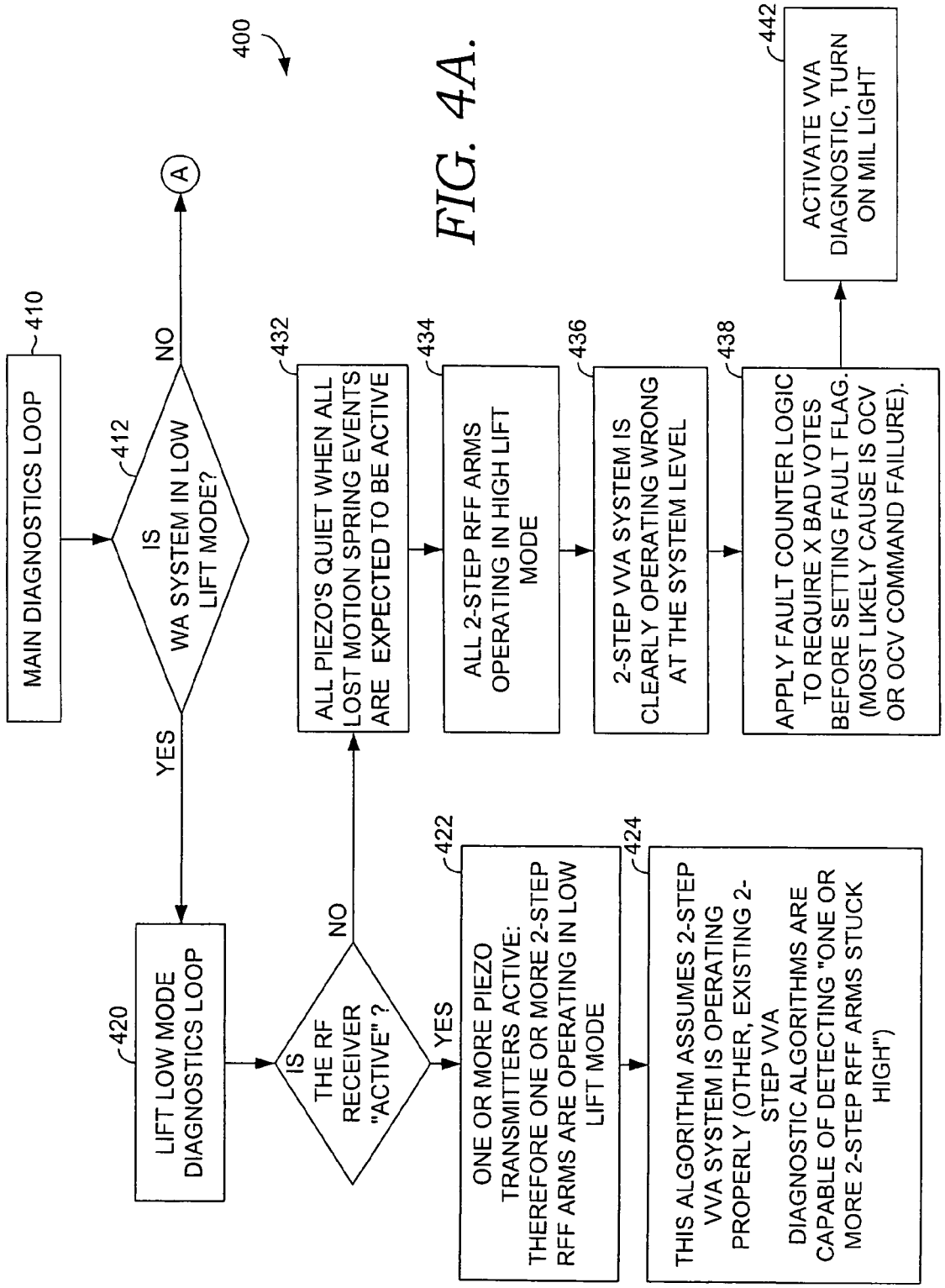
FIGS. 4A and 4B is a flow chart of piezo-electric diagnostics of a variable valve activation system utilizing two-mode roller finger follower assemblies, in accordance with the invention.
Figure 4B:
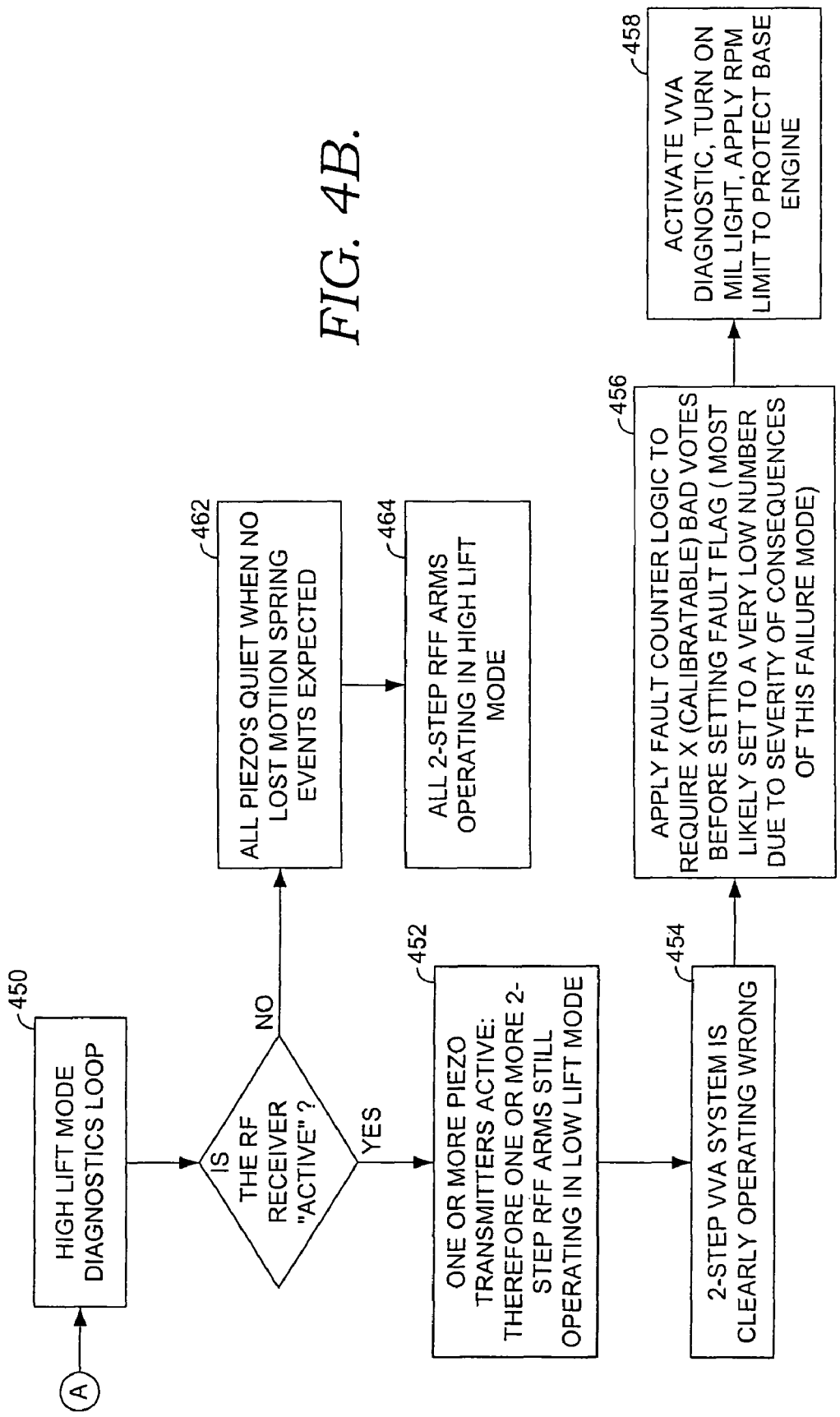

Referring to FIG. 4, piezo-electric diagnostics 400 for a two-mode VVA system 412 utilizing two-mode RFF assemblies, such as two-step RFF assembly 100 and deactivation RFF assemblies 200 and 300 as shown in FIGS. 1 through 3, respectively, includes a low-lift diagnostics loop 420 and a high-lift mode diagnostics loop 450 that are both integrated in a main diagnostics loop 410 of an engine management system of an internal combustion engine. Low-lift mode diagnostics loop 420 is activated when VVA system 412 is operated in low-lift or zero-lift mode and high-lift mode diagnostics loop 450 is activated when VVA system 412 is operated in high-lift mode.

If the RF receiver is active in low-lift mode diagnostics loop 420, one or more piezo-electric elements, such as element 150, 250, or 350 as shown in FIGS. 1-3, respectively, are active and transmit RF signals in a step 422 and, therefore, one or more of the two-mode RFF assemblies are operating in low-lift mode. It is assumed in a step 424 that all two-mode RFF assemblies are operating properly and operation of the engine presumes without changes.

If the RF receiver is not active in low-lift mode diagnostics loop 420, no RF signals are transmitted in a step 432 when all lost motion springs are expected to be active. The engine controller determines in a step 434 that all two-mode RFF assemblies are operating in high-lift mode and concludes in a step 436 that VVA system 412 is operating wrongly at the system level. Fault counter logic that requires a certain number of failures before setting a fault flag is applied in a step 438. In a following step 442, VVA diagnostic is activated and the malfunction indicator light is turned on.

If the RF receiver is active in high-lift mode diagnostics loop 450, one or more piezo-electric elements are loaded compressively and transmit RF signals in a step 452. Therefore, one or more of the two-mode RFF assemblies are still operating in low-lift mode. The engine controller determines in a step 454 that VVA system 412 is operating wrongly. Fault counter logic that requires a certain number of failures before setting a fault flag is applied in a step 456. The fault counter logic may be set to a relatively low number of occurrences due to the severity of consequences of this failure mode. VVA diagnostic is activated in a step 458 and the malfunction indicator light is turned on. In addition, an operating speed limit may be applied to protect the engine from an over-speed condition.

If the RF receiver is not active in high-lift mode diagnostics loop 450, no RF signals are transmitted in a step 462 when no lost motion spring events are expected. It is assumed in a step 464 that all two-mode RFF assemblies are operating in high-lift mode as expected and operation of the engine presumes without changes.

Figure 5:
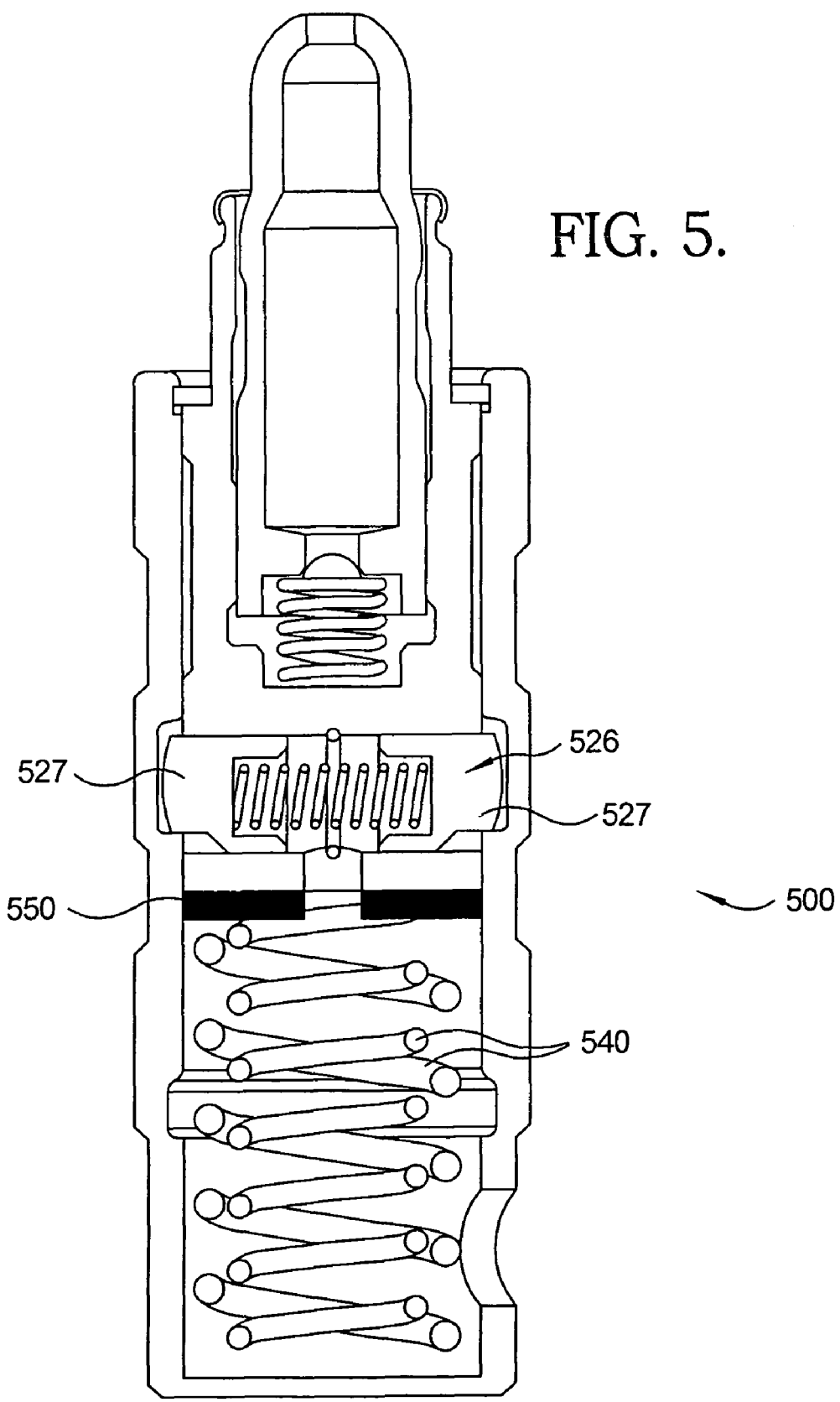
FIG. 5 is a cross-sectional view of a deactivation switching hydraulic lash adjuster assembly, in accordance with the present invention.

Referring to FIG. 5, cylinder deactivation using a deactivation switching hydraulic lash adjuster assembly 500 is another example of a two-mode VVA mechanism. Deactivation switching hydraulic lash adjuster assembly 500 includes a latching mechanism 526, such as the two lock pins 527 shown in FIG. 5, a lost motion spring 540, and a piezo-electric element positioned adjacent to lost motion spring 540 and such that compression of one or more lost motion springs 540 results in a compression load upon piezo-electric element 550.

As with the two-mode RFF assemblies 100, 200, and 300 as shown in FIGS. 1 through 3, respectively, and as described above, when deactivation switching hydraulic lash adjuster assembly 500 is in normal or high-lift mode, latching mechanism 526 holds the two-piece device rigid, substantially blocking lost motion spring 540 and thus piezo-electric element from being compressively loaded, and no RF signal is transmitted. When latching mechanism 526 is disabled and lock pins 527 are moved out of the way by the engine control system, lost motion spring 540 and piezo-electric element 550, receive the compressive loads resulting from absorbing the displacement of the camshaft lobe or lobes, resulting in the piezo-electric element being compressed and transmitting an RF signal. Presence or absence of this RF signal in relation to an expected presence or absence of the RF signal is utilized for diagnostics of the deactivation switching hydraulic lash adjuster assembly 500.

Figure 7:
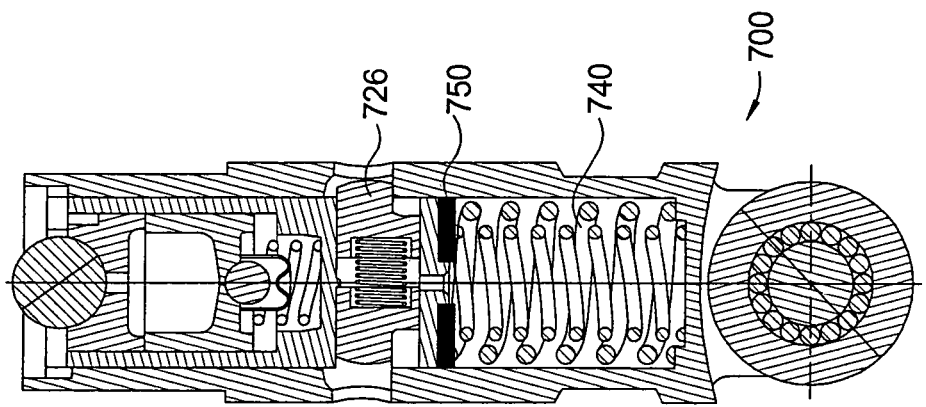
FIG. 7 is a cross-sectional view of a second deactivation roller hydraulic valve lifter assembly, in accordance with the invention.
Figure 6:
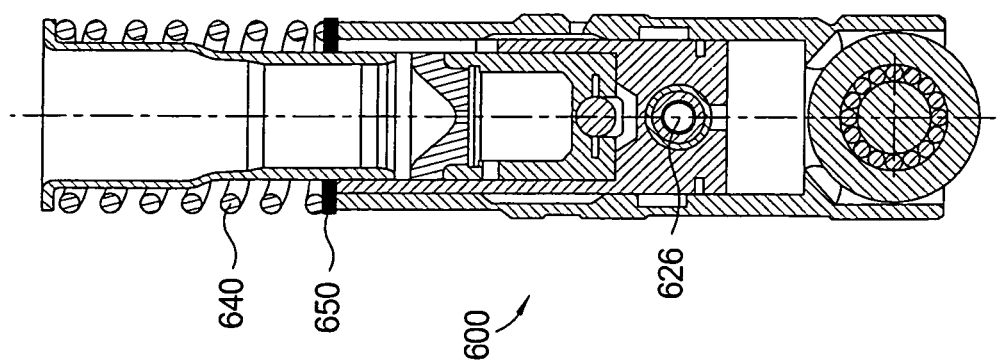
FIG. 6 is a cross-sectional view of a first deactivation roller hydraulic valve lifter assembly, in accordance with the invention.

Referring to FIGS. 6 and 7, a first deactivation roller hydraulic valve lifter assembly 600 including an external lost motion spring 640 and a second deactivation hydraulic valve lifter assembly 700 including an internal lost motion spring 740 as illustrated, respectively. Assembly 600 includes furthermore a latching mechanism 626 and a piezo-electric element 650 that is positioned adjacent to lost motion spring 640 and such that compression of lost motion spring 640 results in a compression load upon piezo-electric element 650. Assembly 700 includes furthermore a latching mechanism 726 and a piezo-electric element 750 that is positioned adjacent to lost motion spring 740 and such that compression of lost motion spring 740 results in a compression load upon piezo-electric element 750. Assemblies 600 and 700 function similar as the deactivation switching hydraulic lash adjuster assembly 500 described above and as shown in FIG. 5.

Figure 8A:
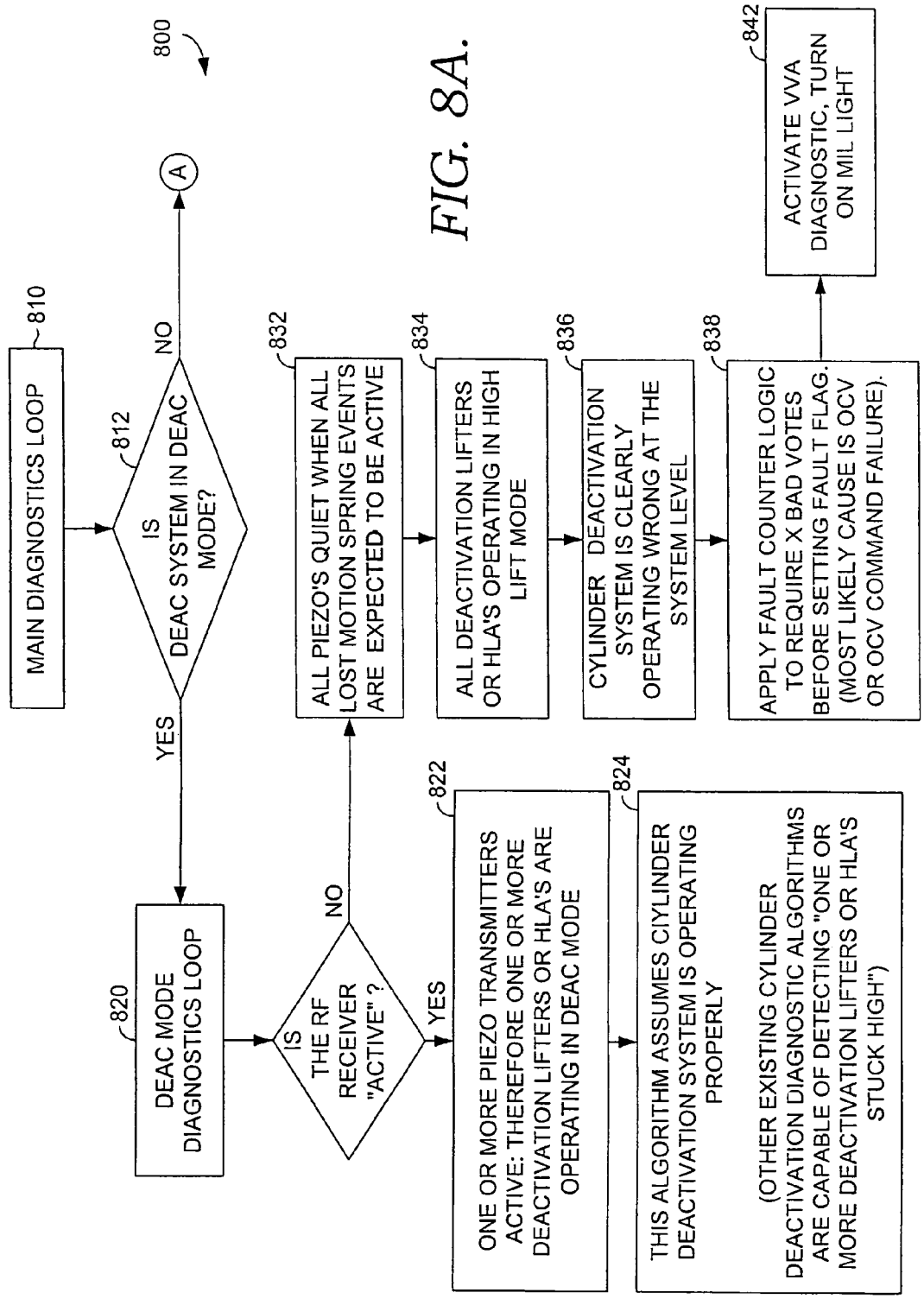
FIGS. 8A and 8B is a flow chart of piezo-electric diagnostics for cylinder deactivation, in accordance with the invention.
Figure 8B:
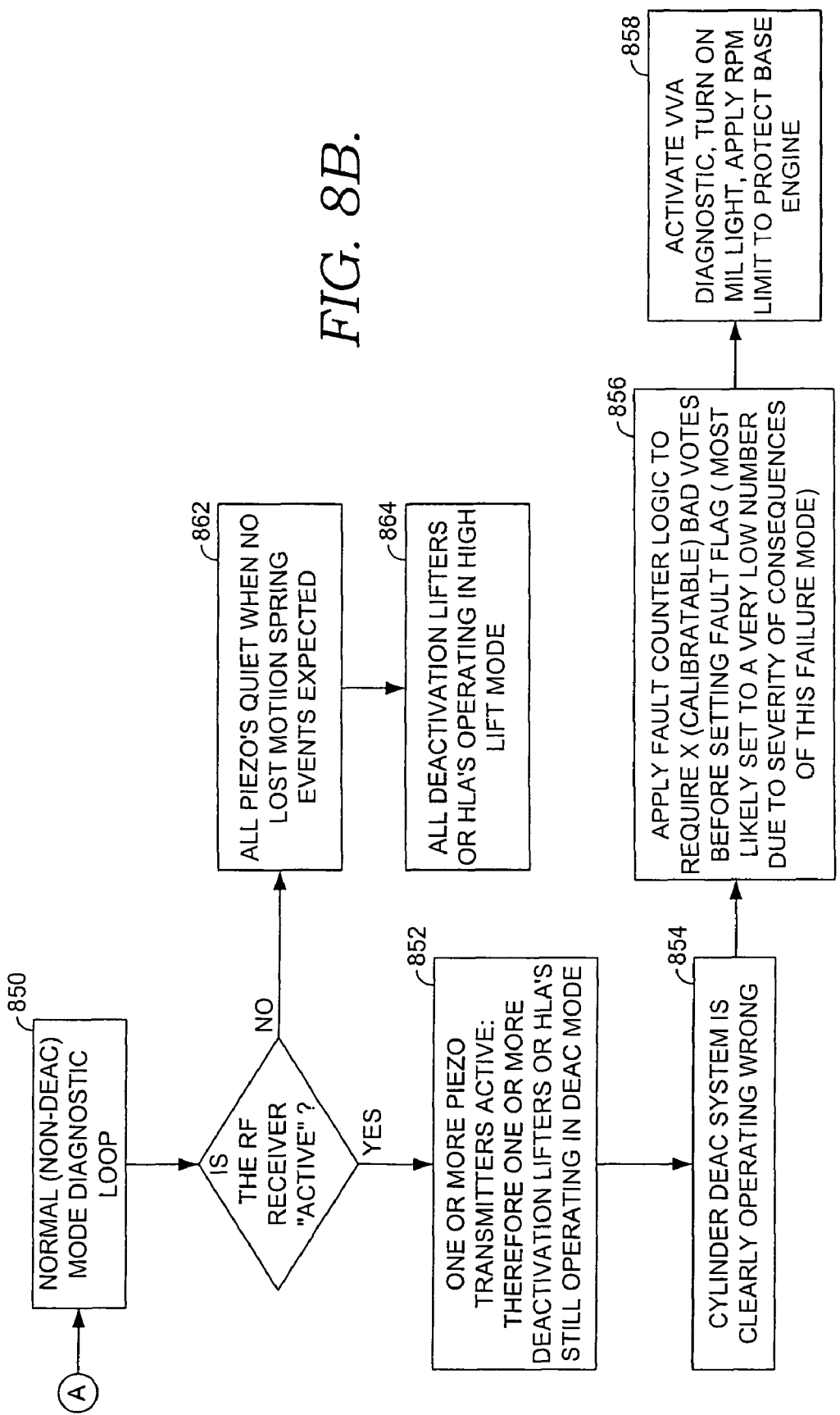

Referring to FIG. 8, piezo-electric diagnostics 800 for a cylinder deactivation system 812 utilizing lost motion deactivation HLA's or lifters, such as deactivation switching hydraulic lash adjuster assembly 500 and deactivation roller hydraulic valve lifter assemblies 600 and 700 as shown in FIGS. 5 through 7, respectively, includes a deactivation mode diagnostics loop 820 and a normal (non-deactivation) mode diagnostics loop 850 are both integrated in a main diagnostics loop 810 of an engine management system of an internal combustion engine. Deactivation mode diagnostics loop 820 is activated when cylinder deactivation system 812 is operated in a deactivation mode and normal mode diagnostics loop 850 is activated when cylinder deactivation system 812 is operated in a normal mode that is comparable to the high-lift mode as in FIG. 4.

If the RF receiver is active in deactivation mode diagnostics loop 820, one or more piezo-electric elements, such as element 550, 650, or 750 as shown in FIGS. 5-7, respectively, are active and transmit RF signals in a step 822 and, therefore, one or more of the deactivation HLA's or lifters are operating in deactivation mode where the associated valves are not opened. It is assumed in a step 824 that the cylinder deactivation system 812 is operating properly and operation of the engine presumes without changes.

If the RF receiver is not active in deactivation mode diagnostics loop 820, none of the piezo-electric elements is active and no RF signals are transmitted in a step 832 when all lost motion springs are expected to be active. The engine controller determines in a step 834 that all deactivation HLA's or lifters are operating in high-lift mode and concludes in a step 836 that cylinder deactivation system 812 is operating wrongly at the system level. Fault counter logic that requires a certain number of failures before setting a fault flag is applied in a step 838. In a following step 842, VVA diagnostic is activated and the malfunction indicator light is turned on.

If the RF receiver is active in normal mode diagnostics loop 850, one or more piezo-electric elements are loaded compressively and transmit RF signals in a step 852. Therefore, one or more of the deactivation HLA's or lifters are still operating in deactivation mode. The engine controller determines in a step 854 that cylinder deactivation system 812 is operating wrongly. Fault counter logic that requires a certain number of failures before setting a fault flag is applied in a step 856. The fault counter logic may be set to a relatively low number of occurrences due to the severity of consequences of this failure mode. VVA diagnostic is activated in a step 858 and the malfunction indicator light is turned on. In addition, an operating speed limit may be applied to protect the engine from an over-speed condition.

If the RF receiver is not active in normal mode diagnostics loop 850, none of the piezo-electric elements is active, and no RF signals are transmitted in a step 862 when no lost motion spring events are expected. It is assumed in a step 864 that all deactivation HLA/s and lifters are operating in normal mode as expected and operation of the engine presumes without changes.

By utilizing the presence of absence of RF signals broadcasted by the piezo-electric elements, such as piezo-electric elements 150, 250, 350, 450, 650, and 750 as shown in FIGS. 1-7, respectively, various levels of diagnosability are possible dependent upon the level of complexity of the electronic circuitry and software. A first level of diagnosability, as shown in FIGS. 4 and 8, is to detect if one or more two-mode VVA lost motion devices transmit an RF signal when all two-mode VVA devices of an engine are operated in high-lift mode and should be quiet. Such a malfunction may set a malfunction indicator light and the engine controller may then take the appropriate failure mode actions to protect the base engine hardware, such as limiting the engine speed. Precise determination of which cylinder or which VVA device is malfunctioning may be done by other related VVA diagnostic algorithms utilizing the existing engine sensor set typically included in the engine management system, as well as dealer service bay diagnostic tools.

A second level of diagnosability is the detection of when in the crank angle domain the RF signal is occurring, and performing a simple calculation to determine its relative position to the engine's firing order. This would permit the diagnostics algorithm to set a different malfunction code for each engine cylinder the malfunction is associated with. The final determination of exactly which two-mode VVA lost motion device is malfunctioning may be left for the dealer service bay.

A third level of diagnosability is applicable for engines having two or more "two-mode" intake valves or exhaust valves per cylinder. By using distinctively different geometry piezo-electric elements in the lost motion devices within a cylinder, a first lost motion device may be constructed to broadcast a signal characteristic, such as signal frequency, that is distinctively different from a signal characteristic broadcasted by a second lost motion device within that same cylinder. Thus, the RF radio receiver may be made to provide different output signals to distinguish between first and second lost motion devices within a single cylinder. This added level of discernment, combined with the crank-angle correlation of the RF signal events, enables the diagnostic not only to determine which cylinder has the malfunctioning two-mode VVA lost motion device, but also which device on which valve in that cylinder. Since camshaft bearing towers typically create asymmetrical packaging needs to the VVA devices, with the third level of diagnosability, it is relatively simple to add an error-proofing asymmetry to the first and second lost motion devices, with similar differences in the geometry or appearance of the unique piezo-electric element for each first and second lost motion device, in order to prevent confusion during the assembly of the components.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A two-mode variable valve activation lost motion device of a hydraulically switchable variable valve activation system of an internal combustion engine, comprising:
   a lost motion spring absorbing a load from displacement of a camshaft lobe; and
   a piezo-electric element positioned relative to said lost motion spring such that a load from displacement of said camshaft lobe acting on said lost motion spring results in a compression load upon said piezo-electric element;
   wherein said piezo-electric element acts as a radio frequency transmitter, said radio frequency transmitter broadcasting a radio frequency signal when said piezo-electric element is subjected to said compression load.

2. The two-mode variable valve activation lost motion device of claim 1, further including:
   a radio frequency receiver that detects said radio frequency signal, wherein said receiver is connected with an engine controller that evaluates said radio frequency signal.

3. The two-mode variable valve activation lost motion device of claim 1, wherein said piezo-electric element is a wafer having a geometric shape selected from a disk, a rectangular plate of a ring.

4. The two-mode variable valve activation lost motion device of claim 1, further including a latching mechanism, wherein said latching mechanism substantially blocks said lost motion spring from said load from said displacement of said camshaft lobe when activated.

5. The two-mode variable valve activation lost motion device of claim 1, wherein diagnostics of the operating mode of said two-mode variable valve activation lost motion device utilizes said radio frequency signal.

6. The two-mode variable valve activation lost motion device of claim 1, wherein said lost motion spring is selected from a compression spring or a torsion spring.

7. A method for detecting a low-lift or zero-lift mode in a variable valve activation system of an internal combustion engine, comprising the steps of:
   positioning a piezo-electric element proximate a lost motion spring of a two-mode variable valve activation lost motion device;
   subjecting said piezo-electric element to a compression load when a load from displacement of a lobe of a camshaft acts on said lost motion spring;
   broadcasting a radio frequency signal each time said piezo-electric element is subjected to said compression load; and
   evaluating the presence or absence of said broadcasted radio frequency signal in relation to an expected presence or absence of said radio frequency signal.

8. The method of claim 7, further including the steps of:
   detecting said radio frequency signal with a radio frequency receiver that is connected with an engine controller; and
   analyzing said radio frequency signal with said engine controller.

9. The method of claim 7, further including the step of:
   positioning a radio frequency receiver under a cover of said engine.

10. The method of claim 7, further including the steps of:
    operating said two-mode variable valve activation lost motion device in a first mode;
    subjecting said lost motion spring to a repetitive cyclical load;
    subjecting said piezo-electric element to a compression load resulting from said repetitive cyclical load; and
    expecting transmission of said radio frequency signal.

11. The method of claim 7, further including the steps of:
    operating said two-mode variable valve activation lost motion device in a second mode;
    substantially blocking said lost motion spring from said compression load by activating a latching mechanism; and
    expecting no transmission of said radio frequency signal.

12. The method of claim 7, further including the step of:
    utilizing a two-step roller finger follower assembly or a deactivation roller finger follower assembly as said two-mode variable valve activation lost motion device.

13. The method of claim 7, further including the step of:
    utilizing a deactivation switching hydraulic lash adjuster assembly or a deactivation roller hydraulic valve lifter assembly as said two-mode variable valve activation lost motion device.

14. The method of claim 7, further including the steps of:
    utilizing a wafer as piezo-electric element; and
    selecting the geometric shape of said wafer depending on the type of said two-mode variable valve activation lost motion device.

15. The method of claim 7, further including the step of:
    selecting said lost motion spring from a compression spring or a torsion spring.

16. The method of claim 7, further including the steps of:
    detecting presence of said broadcasted radio frequency signal when no presence of said radio frequency signal is expected; and
    determining operation of at least one of said two-mode variable valve activation lost motion devices in a first mode when operation in a second mode is expected.

17. A method for piezo-electric diagnostics for a hydraulically switchable two-mode variable valve activation system of an internal combustion engine, comprising the steps of:
    broadcasting a radio frequency signal every time a piezo-electric element positioned relative to a lost motion spring of a two-mode variable valve activation device is subjected to a compressive load from said lost motion spring;
    expecting said radio frequency to be broadcasted when said two-mode variable valve activation device is operated in a low-lift mode or a zero-lift mode;
    expecting said radio frequency not to be broadcasted when said two-mode variable valve activation device is operated in a mode other than a low-lift mode or a zero-lift mode; and
    evaluating the presence or absence of said broadcasted radio frequency signal in relation to said expected and not expected broadcasting of said radio frequency signal.

18. The method of claim 17, further including the steps of:
    determining if a failure mode exists based on said evaluation of said radio frequency signal; and
    issuing a warning if said failure mode exists.

19. The method of claim 17, further including the steps of:
    activating a low-lift mode diagnostics loop when said two-mode variable valve activation system including a plurality of said two-mode variable valve activation devices is operated in said low-lift mode or said zero-lift mode;

determining if an radio frequency receiver is active receiving said broadcasted radio frequency signal;

concluding that at least one of said two-mode variable valve activation devices is operating in said low-lift or said zero-lift mode if said radio frequency receiver is active; and concluding that all of said two-mode variable valve activation devices are operating in said mode other than a low-lift mode or a zero-lift mode if said radio frequency receiver is not active.

20. The method of claim 17, further including the steps of:

activating a diagnostics loop for a mode other than a low-lift mode or a zero-lift mode when said two-mode variable valve activation system including a plurality of said two-mode variable valve activation devices is operated in said mode other than a low-lift mode or a zero-lift mode;

determining if a radio frequency receiver is active receiving said broadcasted radio frequency signal;

concluding that at least one of said two-mode variable valve activation devices is still operating in said low-lift or said zero-lift mode if said radio frequency receiver is active; and concluding that all of said two-mode variable valve activation devices are operating in said mode other than a low-lift mode or a zero-lift mode if said radio frequency receiver is not active.

21. The method of claim 17, further including the steps of:
p1 selecting a piezo-electric element having a first output signal characteristic for a first two-mode variable valve activation device associated with a first cylinder of said internal combustion engine; and selecting a piezo-electric element having a second output signal characteristic that is different from said first output signal characteristic for a second two-mode variable valve activation device associated with said first cylinder.

22. A method for piezo-electric diagnostics for a cylinder deactivation system of an internal combustion engine, comprising the steps of:

broadcasting a radio frequency signal every time a piezo-electric element positioned relative to a lost motion spring of a two-mode variable valve activation device is subjected to a compressive load from said lost motion spring;

expecting said radio frequency to be broadcasted when said two-mode cylinder deactivation device is operated in a deactivation mode where associated valves are not opened;

expecting said radio frequency not to be broadcasted when said two-mode variable valve activation device is operated in a normal mode where associated valve are opened;

evaluating the presence or absence of said broadcasted radio frequency signal in relation to said expected and not expected broadcasting of said radio frequency signal;

determining if a failure mode exists based on said evaluation of said radio frequency signal; and issuing a warning if said failure mode exists.

23. The method of claim 22, further including the step of:
selecting said two-mode cylinder deactivation device from a deactivation switching hydraulic lash adjuster assembly or a deactivation roller hydraulic valve lifter assembly.

24. The method of claim 22, further including the steps of:
activating a deactivation mode diagnostics loop when said cylinder deactivation system including a plurality of said two-mode cylinder deactivation devices is operated in said deactivation mode;

determining if a radio frequency receiver is active receiving said broadcasted radio frequency signal;

concluding that at least one of said two-mode cylinder deactivation devices is operating in said deactivation mode if said radio frequency receiver is active; and concluding that all of said two-mode cylinder deactivation devices are operating in said high-lift mode if said radio frequency receiver is not active.

25. The method of claim 22, further including the steps of:
activating a normal mode diagnostics loop when said cylinder deactivation system including a plurality of said two-mode cylinder deactivation devices is operated in said normal mode;

determining if a radio frequency receiver is active receiving said broadcasted radio frequency signal;

concluding that at least one of said two-mode cylinder deactivation devices is still operating in said deactivation mode if said radio frequency receiver is active; and concluding that all of said two-mode cylinder deactivation devices are operating in said normal mode if said radio frequency receiver is not active.

* * * * *